United States Patent [19]

Inou

[11] Patent Number: 5,774,107

[45] Date of Patent: Jun. 30, 1998

[54] DISPLAY APPARATUS WITH INPUT-FUNCTIONS

[75] Inventor: Ippei Inou, Nara, Japan

[73] Assignee: Sharp Kabushiki Kaisha, Osaka, Japan

[21] Appl. No.: 733,188

[22] Filed: Oct. 17, 1996

[30] Foreign Application Priority Data

Oct. 31, 1995 [JP] Japan .................................. 7-283059

[51] Int. Cl.$^6$ ...................................................... G09G 3/36
[52] U.S. Cl. ............................ 345/104; 345/175; 349/12; 17/18
[58] Field of Search ................................... 345/104, 156, 345/157, 173, 174, 175; 178/18, 19; 341/22, 32, 33, 34; 349/23, 12

[56] References Cited

U.S. PATENT DOCUMENTS

| | | | |
|---|---|---|---|
| 3,861,783 | 1/1975 | Dill et al. ................................. | 349/156 |
| 3,863,332 | 2/1975 | Leupp et al. ............................ | 349/156 |
| 4,295,712 | 10/1981 | Ishiwatari et al. ..................... | 349/156 |
| 4,579,423 | 4/1986 | Fergason . | |
| 4,671,618 | 6/1987 | Wu et al. . | |
| 4,744,639 | 5/1988 | Tsuboyama . | |
| 4,815,826 | 3/1989 | Fergason . | |
| 4,839,634 | 6/1989 | More et al. ............................. | 345/104 |
| 4,890,902 | 1/1990 | Doane et al. . | |
| 5,005,951 | 4/1991 | Te Velde . | |
| 5,089,904 | 2/1992 | Fergason . | |
| 5,103,326 | 4/1992 | Fergason . | |
| 5,119,220 | 6/1992 | Narita et al. . | |
| 5,188,760 | 2/1993 | Hikmet et al. . | |
| 5,194,852 | 3/1993 | More et al. ............................. | 178/19 |
| 5,280,375 | 1/1994 | Tsuda et al. ............................ | 349/128 |
| 5,333,074 | 7/1994 | Hikmet . | |
| 5,379,139 | 1/1995 | Sato et al. ............................... | 349/155 |
| 5,442,373 | 8/1995 | Nomura et al. . | |
| 5,450,220 | 9/1995 | Onishi et al. . | |
| 5,473,450 | 12/1995 | Yamada et al. . | |
| 5,640,258 | 6/1997 | Kurashima et al. .................... | 345/156 |

FOREIGN PATENT DOCUMENTS

| | | |
|---|---|---|
| 0278721 | 8/1988 | European Pat. Off. . |
| 0497619 | 8/1992 | European Pat. Off. . |
| 0568355 | 11/1993 | European Pat. Off. . |
| 56-77884 | 6/1981 | Japan . |
| 58-501631 | 9/1983 | Japan . |
| 59-119320 | 7/1984 | Japan . |
| 59-226322 | 12/1984 | Japan . |
| 61-502128 | 9/1986 | Japan . |
| 61-192335 | 11/1986 | Japan . |
| 63-36224 | 2/1988 | Japan . |
| 1-34336 | 5/1989 | Japan . |
| 2-99920 | 4/1990 | Japan . |
| 2-153318 | 6/1990 | Japan . |
| 2-153319 | 6/1990 | Japan . |
| 3-61925 | 3/1991 | Japan . |
| 3-278024 | 12/1991 | Japan . |
| 4-31823 | 2/1992 | Japan . |
| 4-31824 | 2/1992 | Japan . |
| 4-40424 | 2/1992 | Japan . |
| 4-97121 | 3/1992 | Japan . |
| 4-212928 | 8/1992 | Japan . |
| 4-243412 | 8/1992 | Japan . |
| 4-289818 | 10/1992 | Japan . |

(List continued on next page.)

OTHER PUBLICATIONS

Tagawa et al, "LCD Panel with a Function of Detecting Pen Positions", Sharp Technical Journal, vol. 56, pp. 15–18, 1993.

U.S. Patent application No. 08/625,885, Inou et al., filed Apr. 1996.

*Primary Examiner*—Dennis-Doom Chow
*Attorney, Agent, or Firm*—Nixon & Vanderhye

[57] ABSTRACT

A display apparatus with input-functions which includes touch-panel spacers placed overlapping the area other than the pixels, to thereby enhance its contrast and to increase its input position-detection precision.

10 Claims, 5 Drawing Sheets

FOREIGN PATENT DOCUMENTS

| | | |
|---|---|---|
| 4-323616 | 11/1992 | Japan . |
| 4-338923 | 11/1992 | Japan . |
| 5-11237 | 1/1993 | Japan . |
| 5-27242 | 2/1993 | Japan . |
| 5-53726 | 3/1993 | Japan . |
| 5-257135 | 10/1993 | Japan . |
| 6-301015 | 10/1994 | Japan . |
| 7-114031 | 5/1995 | Japan . |
| A-7-120730 | 5/1995 | Japan . |
| 8-122738 | 5/1996 | Japan . |

DISPLAY APPARATUS WITH INPUT-FUNCTIONS

BACKGROUND OF THE INVENTION

1. Field of the Invention

The present invention relates to a touch panel-equipped, display apparatus with input-functions, and more particularly to a display apparatus with input-functions in which a liquid crystal display device is used as the display unit.

2. Description of the Related Art

In a liquid crystal display apparatus with input-functions which has a touch panel placed at the side of a user of the liquid crystal display apparatus where the touch panel and the liquid crystal display unit are placed in intimate contact with each other, the pressing force due to input with the touch panel causes change in the cell gaps in the liquid crystal display unit, and this results in uneven coloring of display by the liquid crystals. In order to overcome this problem, the touch panel is placed, without being located in intimate contact with the liquid crystal display unit, spaced from the polarizing plate at the side of the user. Here, however, since the distances between points of input on the touch panel and points of display on the liquid crystal display unit cause parallax, the apparatus becomes inconvenient to use. An additional problem is that attenuation and/or reflection of light due to the spacing results in lower contrast and brightness of the display screens.

Attempts to overcome the drawbacks of the prior art are found in, for example, Japanese Unexamined Patent Application Disclosure HEI 7-120730 which discloses a liquid crystal display apparatus which is designed in such a manner that macromolecule-walled micro cells are provided therein to hold liquid crystals in the micro cells to thereby prevent uneven coloring of display by the liquid crystals which is caused by external pressure. Since this method eliminates the necessity of providing the spacing, display by the liquid crystals does not suffer from uneven coloring due to input with the touch panel, the lowering in the contrast is prevented, and parallax between points of input on the touch panel and points of display on the liquid crystal display unit is minimized.

The outer dimensions, input areas, etc. of the touch panel have been designed in consideration of the outer dimensions, display areas, etc. of the display apparatus. On the other hand, the positions of the touch-panel spacers have been designed, without considering their positional relationships with pixels of the display apparatus, in consideration of the touch panel alone, e.g., so as to locate the spacers at positions other than intersections of the touch-panel electrodes, as disclosed in Japanese Unexamined Utility Model Law Application Disclosure SHO 61-192335, for example. In particular, with touch panels operated according to the resistance film-based input position-detecting system, since the electrodes are formed over the entire input area, positions of the touch-panel spacers have been designed in particular consideration of input position-detection precision, but without considering their positional relationships with pixels of the display apparatus, etc.

In cases where the positions of the touch-panel spacers are designed without considering their positional relationships with pixels of the display apparatus, a problem arises that contrast of the display apparatus with input-functions is impaired due to scattering and/or refraction of light by the touch-panel spacers if the touch-panel spacers are placed overlapping the pixels. This problem becomes more serious when the display apparatus is a liquid crystal display apparatus, in particular, a reflection-type liquid crystal display apparatrutus which is used for portable information terminals with no light sources provided, since the contrast of such liquid crystal apparatus with input-functions is inherently low.

In addition, when it is designed so that input is performed by designating a predetermined pixel, a pixel which underlies a touch-panel spacer sometimes becomes a pixel which rejects input, and this may result in erroneous designation of another pixel abutting the intended pixel, thus presenting the problem of lower input position-detection precision.

This problem also becomes more serious for a liquid crystal display apparatus with input-functions in which a liquid crystal display unit and a touch panel are placed in intimate contact with each other, since the apparatus has no clearance between the liquid crystal display unit and the touch panel, and thus has small parallax between the points of input and the points of display.

SUMMARY OF THE INVENTION

It is therefore an object of the present invention, which has been accomplished in view of the foregoing problems of the prior art, to enhance the contrast of a display apparatus with input-functions and further to increase the input position-detection precision of the display apparatus.

In order to accomplish the object, the display apparatus with input-functions according to the present invention is characterized as a display apparatus with input-functions equipped with a touch panel which form spacers located near at least one of a pair of electrode substrates and is placed at the side of the user of the display unit, with the spacers placed overlapping areas other than the pixels in the display apparatus.

The display apparatus with input-functions is further characterized in that the center of the spacer may be placed overlapping the center of a cross-shaped intersection of an area other than the pixels.

The display apparatus with input-functions is further characterized in that the display apparatus may be a liquid crystal display apparatus.

More preferably, the liquid crystal display apparatus contains small liquid-crystal areas partly or entirely surrounded by a wall structure of a patterned configuration.

The display apparatus with input-functions is further characterized in that the touch panel uses a resistance film-based input system as the input position-detecting system.

The display apparatus with input-functions is further characterized in that the center of the spacer may be placed overlapping an arbitrary point on a line in the area other than the pixels which is spaced equidistantly from adjacent pixels.

In cases where touch-panel spacers are placed overlapping the areas in the display apparatus other than the pixels according to the present invention, the overlap area of the touch-panel spacers and the pixels is reduced. This minimizes scattering and/or refraction of light by the touch-panel spacers in the pixel areas, and thus not only the contrast of the display apparatus with input-functions is enhanced, but also erroneous designation of another pixel abutting the pixel designated by the point of input is reduced thereby to increase the input position-detection precision.

Also, according to the invention, the overlap area of the touch-panel spacers and the pixels may further be minimized by placing the centers of the touch-panel spacers so as to overlap the areas other than the pixels.

The placement of the centers of the touch-panel spacers arbitrary points on lines overlappingly in the area other than the pixels which are spaced equidistantly from the adjacent pixels further minimizes the overlap area of the touch-panel spacers and the pixels.

In addition, the overlap area of the touch-panel spacers and the pixels may be further minimized by placing the centers of the touch-panel spacers so as to be aligned with the centers of the cross-shaped intersections of the area other than the pixels. This further reduces scattering and/or refraction of light by the touch-panel spacers in the pixel areas, and thus not only the contrast of the display apparatus with input-functions is further enhanced, but also erroneous designation of another pixel abutting the pixel designated by the point of input is further reduced to further increase the input position-detection precision.

Also, the enhanced contrast of the liquid crystal display apparatus with input-functions is more clearly recognized when the display apparatus is a liquid crystal display apparatus, in particular, a reflecting-type liquid crystal display apparatus for use in portable information terminals, etc. which are not equipped with light sources, since the contrast of such liquid crystal apparatus with input-functions is inherently low.

In addition, in the case of a liquid crystal display apparatus with input-functions of a type in which the liquid crystal display unit and the touch panel are located in intimate contact with each other, since there is provided no spacing between the liquid crystal display unit and the touch-panel spacers, there is no decrease in the contrast of the liquid crystal display apparatus with input-functions due to spacing-caused attenuation and/or reflection of light, and therefore the enhanced contrast of the liquid crystal display apparatus with input-functions is more clearly recognized; the higher input position-detection precision may be more clearly recognized as well, since the parallax between points of input and points of display is decreased.

Also, in the case of the liquid crystal display apparatus with input-functions of a type in which the liquid crystal display unit has small liquid-crystal areas partly or entirely surrounded by wall structures of a patterned configuration, since touch-panel spacers are present right above the wall structure of a patterned configuration, the touch panels and the liquid crystal display unit are substantially assembled, and the composite configurations serve as pillars of the liquid crystal display apparatus with input-functions to increase the strength against forcing pressure, etc.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
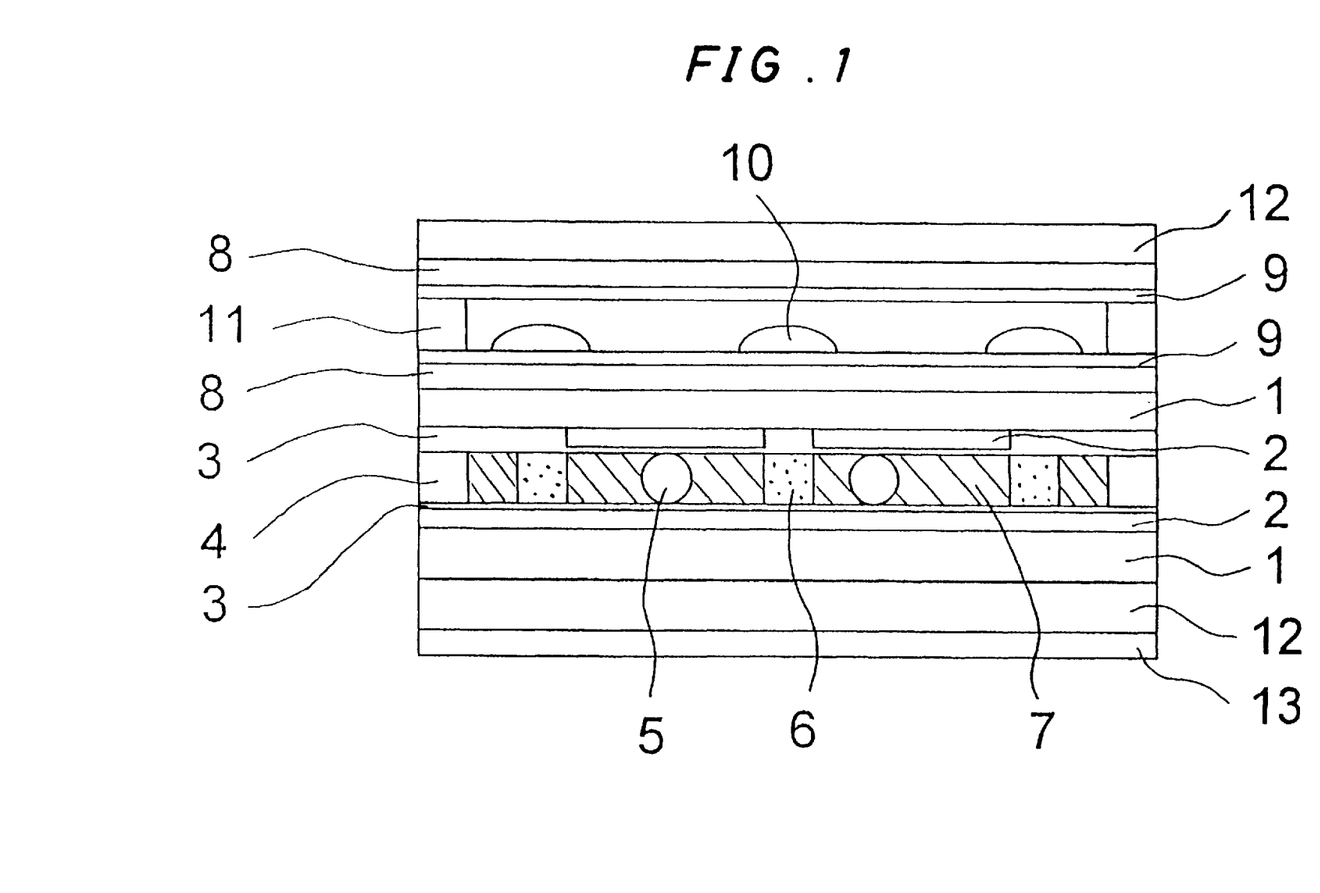
FIG. 1 is a schematic cross-sectional view illustrative of a liquid crystal display apparatus with input-functions according to an embodiment of the present invention.

In order to fabricate a liquid crystal display apparatus with input-functions as illustrated in FIG. 1, 0.4-mm-thick acrylic plastic substrates were used as a pair of electrode substrates 1, 1 for the liquid crystal display unit to form ITOs as transparent electrodes 2, 2, and then to form an electrode pattern for display in dot matrixes by conventional wet etching.

Orientation films 3, 3 were then formed, subjected to an orientation process by rubbing, laminated with a seal 4 and spacers 5 for the liquid crystal display unit, and then divided into predetermined configurations. A mixture of a liquid crystal material and a photo-setting resin was then injected, ultraviolet rays were applied using a photomask in a pattern matching the pattern of pixels to fabricate a liquid crystal display apparatus which contains small liquid-crystal areas 7 surrounded by wall structures 6 of a patterned configuration.

Separately, 0.1-mm-thick polycarbonate substrates were used as a pair of touch-panel electrode substrates 8, 8, ITOs were formed on the surfaces of the electrode substrates 8, 8 as touch-panel transparent electrodes 9, 9, and a pattern of resistance film-based electrodes was formed by conventional wet etching. An ultraviolet-curing resin was subjected to screen printing to form touch-panel spacers 10 which had diameters of 30 $\mu$m and heights of 10 $\mu$m, and were spaced from each other with a spacing five times that of the pixels of the liquid crystal display unit, and peripheral sections of the pair of the electrodes 9, 9 were laminated via a double-sided adhesive tape 11 to fabricate a resistance film-based touch panel.

Figure 2:
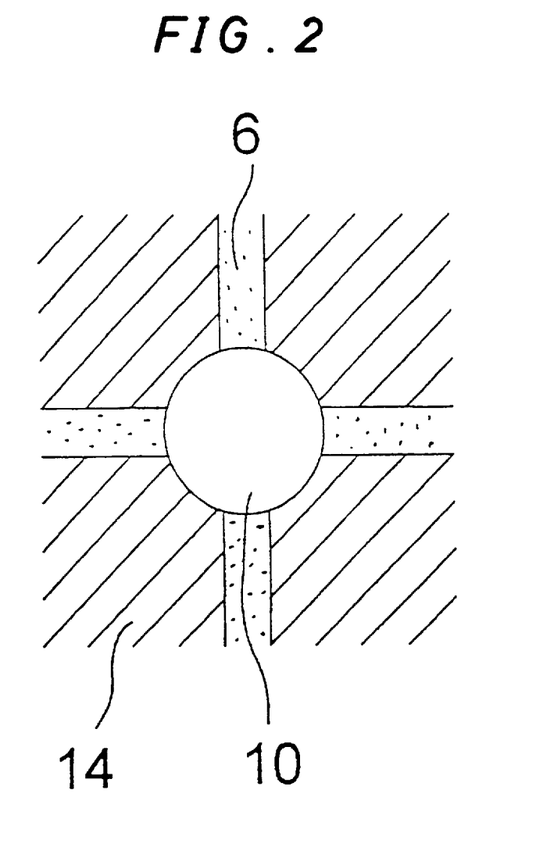
FIG. 2 is a view illustrative of the positional relationship between the touch-panel spacer and the pixels according to the embodiment of the invention.

The liquid crystal display unit which had the small liquid-crystal areas 7 surrounded by the wall structures 6 of a patterned configuration and the resistance film-based touch panel were then aligned, as illustrated in FIG. 2, in such a manner that the center of each touch-panel spacer 10 overaps the center of a cross-shaped intersection of the wall structure 6 of a patterned configuration, that is, the area other than the pixels 14, to fabricate a liquid crystal display apparatus with input-functions, with a polarizing plate 12 placed at the side of the user, and another polarizing plate 12 and a reflecting plate 13 placed across the apparatus from the user.

Figure 3:
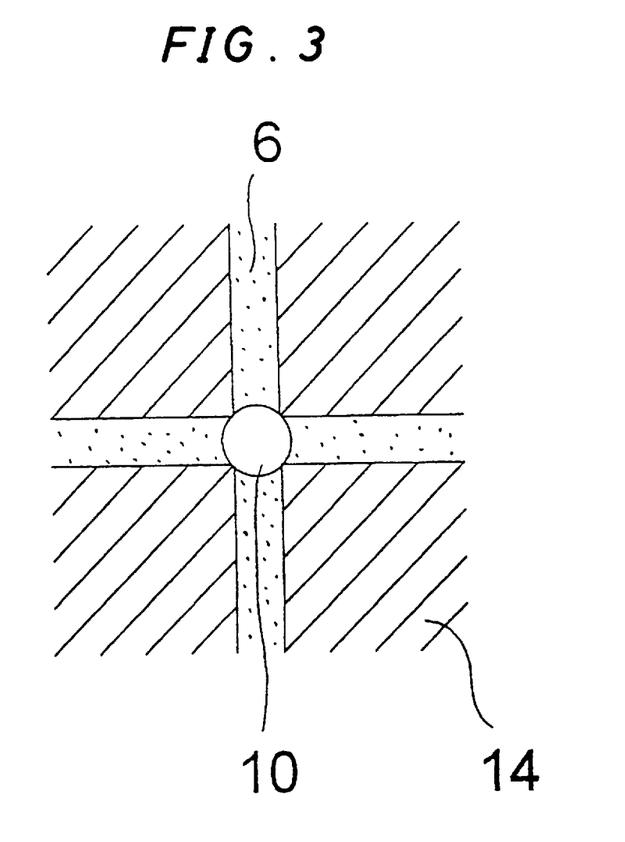
FIG. 3 is a view illustrative of the positional relationship between the touch-panel spacer and the pixels according to another embodiment of the invention.

The liquid crystal apparatus with input-functions which was prepared in this way, being almost free from overlaps of the touch-panel spacers 10 and the pixels 14 of the liquid crystal unit, had enhanced contrast and higher input position-detecting precision. Here, the sizes of the touch-panel spacers are preferably set so as to prevent overlapping of the pixels 14 and the touch-panel spacers 10, as illustrated in FIG. 3.

As an additional advantage, since the touch-panel spacer 10 overlays the wall structure 6 of a patterned configuration, the resulting arrangement serves as pillars of the liquid crystal display apparatus with input-functions to increase the strength against forcing pressure, etc.

Figure 4:
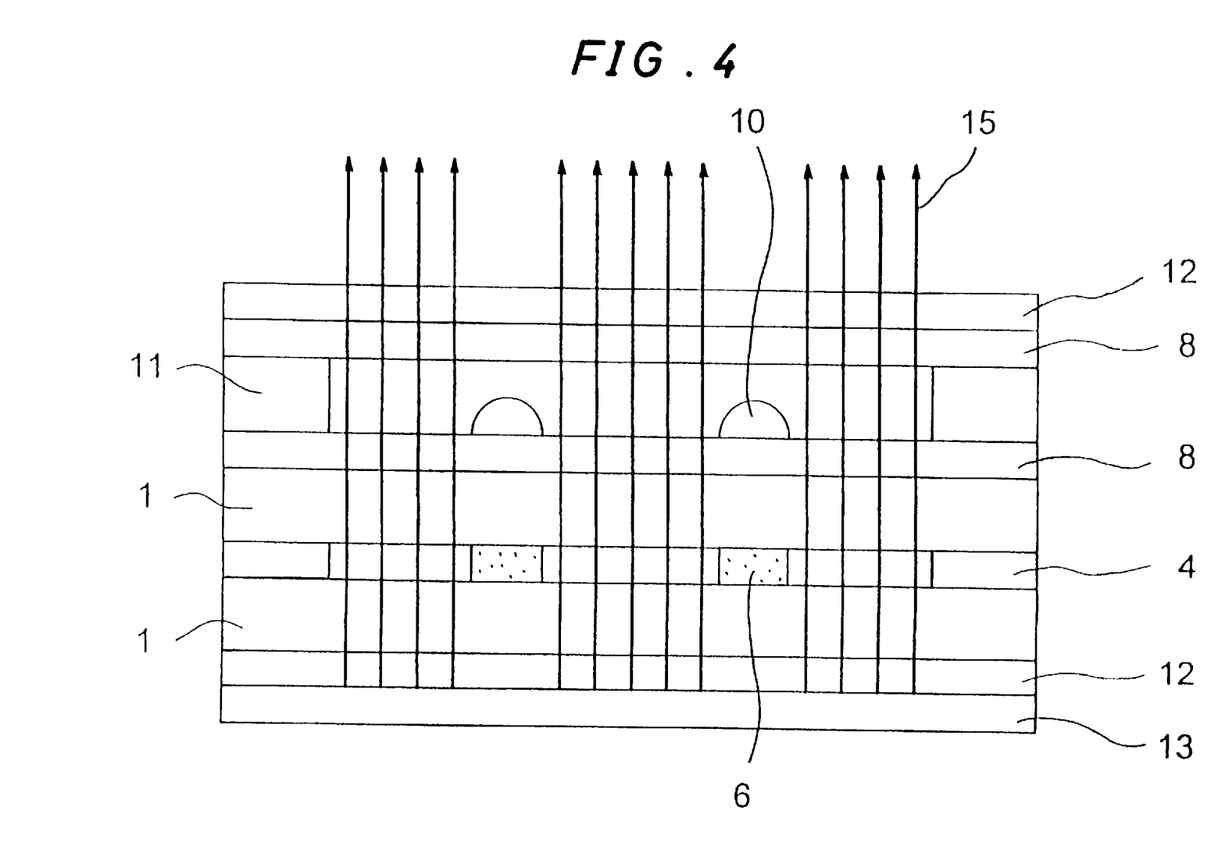
FIG. 4 is a view illustrative of the state of light in the liquid crystal display apparatus with input-functions which is illustrated in FIG. 1.
Figure 5:
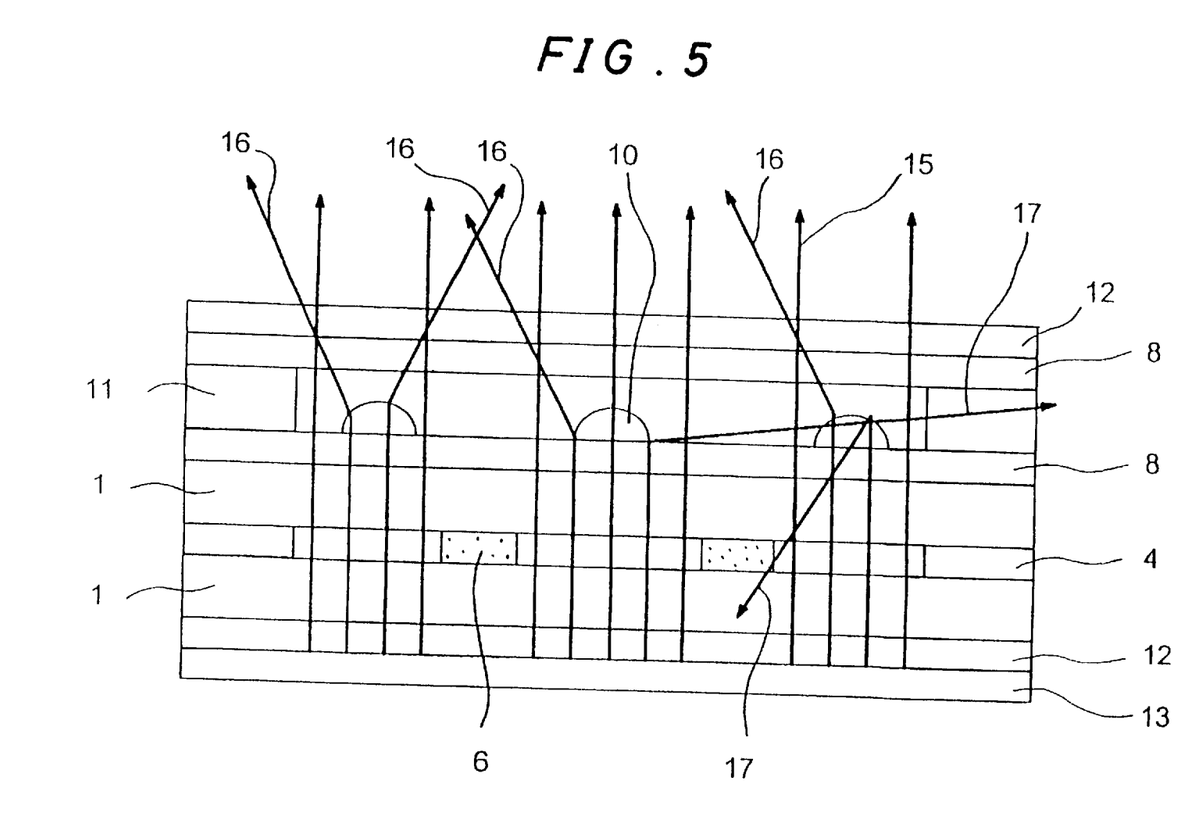
FIG. 5 is a view illustrative of the state of light in a liquid crystal display apparatus with input-functions according to the prior art.

In addition, if the touch-panel spacers 10 and the pixels 14 overlap with each other, as illustrated in FIG. 5, then normal light 15 reflected from a reflecting plate 13 changes into refracted light 16 and reflected light 17 due to the touch-panel spacers 10 to thereby lower the contrast of a liquid crystal display apparatus with input-functions, whereas since the touch-panel spacers 10 and the pixels 14 hardly overlapped with each other in the case of the liquid crystal display apparatus with input-functions prepared according to the present embodiment, the light reflected from the reflecting plate 13 was almost normal light 15, as illustrated in FIG. 4, which enhanced the contrast.

There are no particular limitations to be placed on the material of the electrode substrates 1, 1 for the liquid crystal display unit according to the invention; the substrate may be any heat-resistant plastic substrate such as polyether sulfone, polyacrylate, polycarbonate, acrylic resin, epoxy resin, or a glass substrate. There are no limitations to be placed on the thickness, either; plastic substrates of thickness on the order of 0.05–0.5 mm, and glass substrates of thickness on the order of 0.3–1.1 mm may be used without problems.

The material of the transparent electrodes 2, 2 for the liquid crystal display unit need not be limited to any special one, and can be one other than ITO. Also, there are no particular limitations to be placed on the conditions for film formation, thickness and resistance.

There are no particular limitations to be placed on the method of forming the electrode pattern of the liquid crystal display unit, the forming method, material and orientating method for the orientation films 3, 3, and the material, locating method, laminating method and dividing method for the spacers 5 for the liquid crystal display unit.

The liquid crystal material may be mixed with a photo-polymerization initiator, etc. in addition to a photo-setting resin, and may of course be used alone. The display mode may be established by the use of TNs or STNs, by ferroelectricity, phase transition or dispersion of macromolecules or by the use of ferroelectric macromolecules or the like, and further active elements such as MIMs and TFTs may be provided. Likewise, the injection method is not limited to any special one.

The touch-panel electrode substrates 8, 8 are not limited to special ones, and may be phase difference plates for liquid crystal display units or the same type as the polarizing plate 12 for the liquid crystal display unit at the side of the user. In addition, the electrode substrate 1 for the liquid crystal display unit at the side of the user may be designed to serve also as the touch-panel electrode substrate 8 across the display apparatus from the user so that the apparatus is constructed of three electrode substrates. Likewise, no particular limits are placed on the thickness.

No special material is required for the touch-panel transparent electrodes 9, 9, and it may be one other than ITO. No particular limits are placed on the conditions for film forming, thickness and resistance, either.

The touch-panel spacers 10 are not required to be special ones, and may be made of materials other than ultraviolet-curing resins, such as thermosetting resins. The forming method is not required to be a special one, either; the method may be one other than screen printing, for example, photo-lithography. Likewise, the shapes are not required to be special ones, and may be cylindrical, cross-shaped or like inverted bowls. Although the sizes need not be particularly limited so long as optimum input position-detection precision is ensured, the spacers 10 are preferably sized so as not to overlap the pixels 14 of the display unit. Although the spacing between the touch-panel spacers 10 are not required to be certain values so long as the input position-detection precision is optimized, it is preferred that the spacing be an integral multiple of the spacing of the pixels of the display unit, with the centers of the cross-shaped intersections of the area other than the pixels 14 aligned with the centers of the touch-panel spacers 10. The heights of the touch-panel spacers 10 need not be particularly limited so long as optimum input position-detection precision is ensured.

Although the positional relationship between the touch panel and the liquid crystal display unit may be as desired so long as at least part of each of the touch-panel spacers 10 overlap the area of the liquid crystal display unit other than the pixels 14, preferably the center of the touch-panel spacer 10 overlap the area other than the pixels 14, more preferably, the center of the touch-panel spacers 10 is positioned overlapping an arbitrary point on a line in the area other than the pixels 14 which is spaced equidistantly from the adjacent pixels 14, and most preferably, the center of the touch-panel spacer 10 is aligned with the center of the cross-shaped intersection of the area other than the pixels 14.

As described above, according to the invention, since at least part of each of the touch-panel spacers is positioned to overlap the area of the display unit other than the pixels, the contrast of the display apparatus with input-functions is enhanced, and the input position-detection precision is increased.

In addition, the center of the touch-panel spacer are positioned to overlap the area other than the pixels, and this contributes to more enhanced contrast of the display apparatus with input-functions and to higher input position-detecting precision.

Furthermore, the placement of the centers of the touch-panel spacer on arbitrary points on lines overlappingly in the area other than the pixels which are spaced equidistantly from the adjacent pixels further enhances the contrast of the display apparatus with input-functions, and further increases the input position-detecting precision.

Additionally, the placement of the centers of the touch-panel spacers so as to be aligned with the centers of the crosses of the cross-shaped intersections of the area other than the pixels allows to further enhance the contrast of the display apparatus with input-functions and to further increase the input position-detecting precision.

The enhanced contrast of the liquid crystal display apparatus with input-functions is more clearly recognized when the display unit is a liquid crystal display device, in particular, a reflecting-type liquid crystal display device for use in portable information terminals, etc. which are not equipped with light sources.

The enhanced contrast of the liquid crystal display apparatus with input-functions is more clearly recognized, and the increase in the input position-detection precision may also be recognized more clearly when the liquid crystal display apparatus with input-functions is a type constructed of a light crystal display unit and a touch panel which are placed in intimate contact with each other.

In addition, in the case of the liquid crystal display apparatus with input-functions of the type in which the liquid crystal display unit has the small liquid-crystal areas partially or entirely surrounded by the wall structure of a patterned configuration, the strength of the liquid crystal display apparatus against pressing force or the like is increased.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A display apparatus with input functions comprising:

a discrete liquid crystal display having a pair of spaced electrodes and liquid crystal material between said pair of electrodes patterned to define pixels in the liquid crystal display; and a discrete touch panel overlying said liquid crystal display including a plurality of spacers spaced from one another, each said spacer of said touch panel superposing an area other than said pixels of said liquid crystal display when said touch panel overlies said liquid crystal display such that all pixels of the liquid crystal display and spacers of said touch panel are substantially out of alignment with one another.

2. A display apparatus according to claim 1 wherein said touch panel includes transparent electrodes.

3. A display apparatus according to claim 1 wherein a center of each spacer overlaps a center of a cross-shaped intersection of said area other than said pixels.

4. A display apparatus according to claim 1 wherein said liquid crystal material is divided into discrete areas thereof surrounded by wall structures of a patterned configuration.

5. A display apparatus according to claim 1 wherein said touch panel has a resistance film-based input system forming an input detection system.

6. A display apparatus according to claim 1 wherein a center of each spacer overlaps an arbitrary point on a line in said area of the said pixels which is spaced equidistantly from adjacent pixels.

7. A display apparatus according to claim 1 wherein said touch panel includes transparent electrodes, a center of each spacer overlapping a center of a cross-shaped intersection of said area other than said pixels, said liquid crystal material being divided into discrete areas thereof surrounded by wall structures of a patterned configuration.

8. A display apparatus according to claim 7 wherein said touch panel has a resistance film-based input system forming an input detection system.

9. A display apparatus according to claim 1 wherein said liquid crystal display and said discrete touch panel lie in planes generally parallel to one another when said touch panel overlies said liquid crystal display, said pixels of the liquid crystal display and said spacers of said touch panel being out of alignment relative to one another in a direction generally perpendicular to said planes.

10. A display apparatus with input functions comprising:

a discrete liquid crystal display having a pair of spaced electrodes, wall structures patterned to enclose liquid crystal material between the wall structures and the pair of electrodes to define pixels in the liquid crystal display and a reflecting panel; and a discrete touch panel overlying said liquid crystal display including a plurality of spacers spaced from one another, said liquid crystal display and said discrete touch panel lying in planes generally parallel to one another when said touch panel overlies said liquid crystal display, each said spacer being superposed over intersections of said patterned wall structures when said touch panel overlies said liquid crystal display such that substantially all light entering said touch panel and said liquid crystal display in a direction normal to said planes is reflected by said reflecting panel as normal light leaving the display apparatus.

* * * * *